United States Patent [19]

Schwabe

[11] 4,083,533
[45] Apr. 11, 1978

[54] TECHNIQUE FOR PLACING TENSILE ELEMENTS IN CONDUITS

[75] Inventor: Willie Carl Schwabe, Corpus Christi, Tex.

[73] Assignee: Lois I. Oaden, Corpus Christi, Tex.

[21] Appl. No.: 648,297

[22] Filed: Jan. 12, 1976

[51] Int. Cl.² ............................................. E21C 29/16
[52] U.S. Cl. ................................................. 254/134.4
[58] Field of Search ....................... 254/134.4, 134.3 R, 254/134.3 FT; 15/104.06 R; 226/95; 273/58 C

[56] References Cited

U.S. PATENT DOCUMENTS

| | | | |
|---|---|---|---|
| 1,035,994 | 8/1912 | Mueller | 254/134.4 |
| 1,582,983 | 5/1926 | Hamblet | 273/58 C |
| 2,729,424 | 1/1956 | Eppensteiner | 254/134.4 |
| 2,794,197 | 6/1957 | Crane | 254/134.4 |
| 2,951,255 | 9/1960 | Ver Nooy | 15/104.06 R |
| 3,119,600 | 1/1964 | Bitter | 254/134.4 |
| 3,244,402 | 4/1966 | Ensley | 254/134.3 |
| 3,244,403 | 4/1966 | Ensley | 254/134.4 |
| 3,276,061 | 10/1966 | Ver Nooy | 15/104.06 R |
| 3,301,531 | 7/1975 | Corsiglia | 254/134.4 |
| 3,651,530 | 3/1972 | Schultz | 15/104.06 R |
| 3,729,195 | 4/1973 | Hutt et al. | 273/58 C |
| 3,793,732 | 2/1974 | Hamrick | 254/134.4 |

Primary Examiner—Robert C. Watson
Attorney, Agent, or Firm—G. Turner Moller

[57] ABSTRACT

There is disclosed a resilient spherical piston attached to an elongate tensile element. Compressed air is used to propel the piston through a conduit and thereby place the tensile element therein. The tensile element is connected to the resilient sphere in such a manner that the sphere elongates and decreases in diameter when the piston becomes stuck in the conduit and the tensile element is pulled.

11 Claims, 5 Drawing Figures

TECHNIQUE FOR PLACING TENSILE ELEMENTS IN CONDUITS

In many situations, it is necessary or desirable to place tensile elements inside conduits, for example in installing electrical wiring. In such situations, the electrical conduits are first installed with no wires therein and may be embedded in concrete, disposed within walls, or otherwise situated so that only the open conduit ends are available for access.

The technique that has been developed by the industry is basically to place an elongate tensile element through the conduit, attach the electrical wiring to the tensile element and then pull the tensile element through the conduit until the electrical wiring is disposed therein. The necessary electrical connections can then be made and the conduit ends closed to complete the task.

One technique which is widely used to place the elongate tensile element in the electrical conduit is to place a piston arrangement attached to the elongate tensile element in the conduit and then deliver compressed air to the conduit to force the piston and the tensile element therethrough. When the piston clears the opposite conduit end, the elongate tensile element will extend through the conduit and provide a basis for pulling the electrical wiring therethrough. Although pistons of various shapes have been used in the prior art, there is disclosed a spherical piston in U.S. Pat. No. 3,301,531.

It would appear that a resilient generally spherical piston would be highly desirable in order to readily negotiate bends or curves in the electrical conduit and to pass incrustations, interior wrinkles or other obstructions inside the conduit.

A major disadvantage of the piston construction illustrated in U.S. Pat. No. 3,301,531 resides in the connection between the elongate tensile element and the spherical piston. One difficulty that periodically occurs is that the piston becomes securely lodged inside the conduit. This may occur if an obstruction inside the conduit is too large to be accommodated by the resiliency of the piston. The first approach for freeing the piston is, of course, to increase the pressure of the compressed air delivered thereto in the hope that the piston might be further propelled through the conduit. If this approach fails, it would appear that the next most apparent technique would be to pull on the tensile element in the hope that the piston might be retrieved from the conduit. An analysis of the connection between the spherical piston and the elongate tensile element disclosed in U.S. Pat. No. 3,301,531 will reveal that this approach is unsatisfactory since a pull on the elongate tensile element will tend to expand the diameter of the spherical piston thereby more securely wedging it in the conduit. Accordingly, the only manner in which the piston might be dislodged by a pull on the tensile element is to tear it up.

Another disclosure of interest is found in U.S. Pat. No. 1,035,994 which discloses a collapsible piston for placing a tensile element inside a conduit. The piston may be collapsed by pulling on one of two tensile elements attached thereto. Besides requiring two tensile elements which may become tangled or otherwise increase friction, the disclosed construction requires a multiplicity of parts.

Another disclosure of interest is found in U.S. Pat. No. 2,794,197 which superficially appears pertinent. It becomes apparent upon the following analysis, however, that a pull on the analogous tensile element tends to wedge the piston more securely in the conduit. The disclosed piston is propelled through the conduit by high pressure water. If the piston becomes stuck, water is accordingly disposed between the piston and the conduit inlet. Since the piston has openings therein, the increased water pressure acts on the inside of the piston forcing the piston wall against the inner conduit wall. Accordingly, the diameter of the piston does not reduce but instead tends to enlarge thereby wedging the piston more securely in the conduit.

It is an object of this invention to provide an improved technique for placing a tensile element inside a conduit.

Another object of this invention is to provide an improved techinque for retrieving a piston which has become lodged inside a conduit while placing a tensile element therein.

In summary, one aspect of the invention comprises a method including pulling a single tensile element through a conduit comprising attaching the tensile element to a resilient piston, placing the piston in the conduit and delivering fluid under pressure into the conduit and propelling the piston therethrough; sticking the piston in the conduit; and then retrieving the piston from the conduit including pulling on the single tensile element and elongating the resilient piston and decreasing the diameter thereof until the piston is free in the conduit.

In summary, another aspect of the invention comprises apparatus for placing a tensile element in a conduit including a resilient piston having a closed peripheral wall and a tensile element and means connecting the tensile element to the piston for elongating the piston and decreasing the diameter thereof when the piston is stuck in the conduit and the tensile element is pulled.

Figure 1:
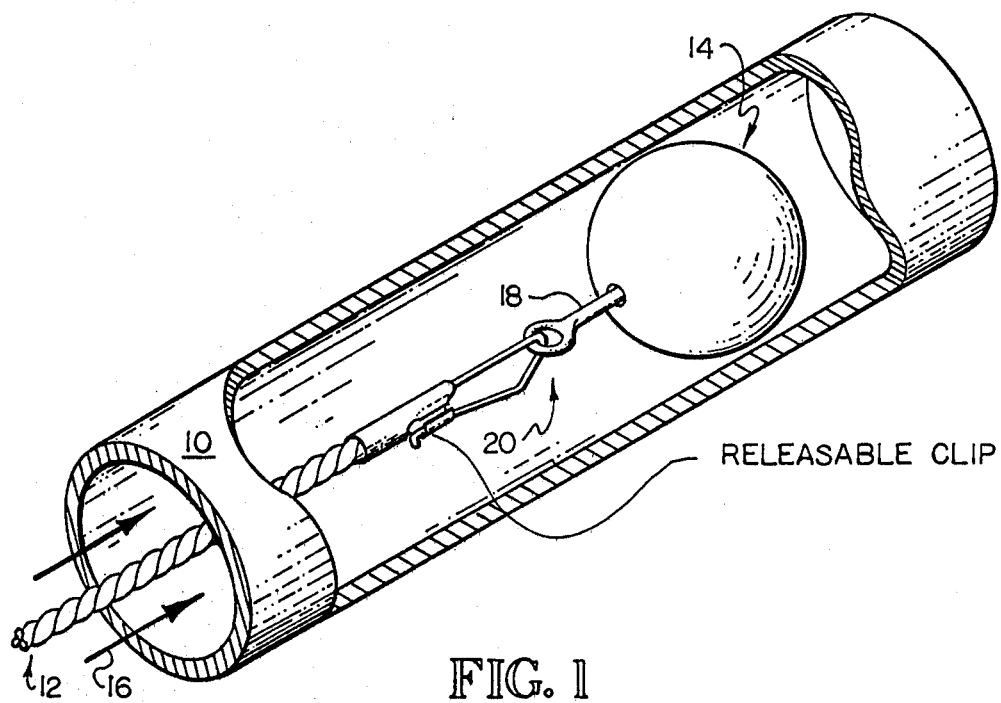
FIG. 1 is an isometric view of a device of this invention in operation during placement of a tensile element in a conduit.

Referring to FIGS. 1-4, there is illustrated a conduit 10 in which a tensile element 12 is being placed by a piston 14 acting in response to compressed air as illustrated by the arrows 16. The elongate tensile element 12 may be of substantially one piece or may be segmental in nature as suggested by a lead 18 and releasable clip 20 illustrated in FIG. 1. The releasable clip 20 allows pistons 14 of various size to be connected to the tensile element 12.

Figure 2:
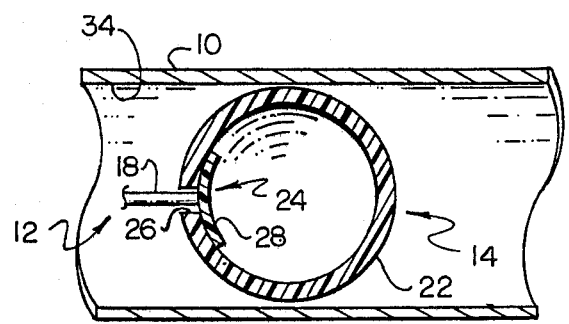
FIG. 2 is a longitudinal cross-sectional view of the device of FIG. 1.
Figure 3:
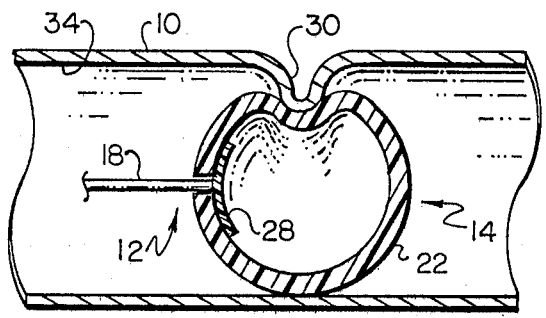
FIG. 3 is a view similar to FIG. 2 illustrating the piston of this invention securely lodged inside the conduit.
Figure 4:
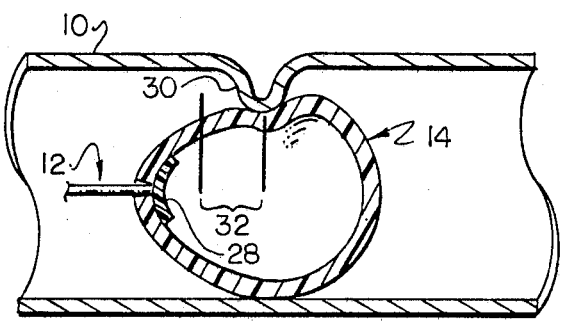
FIG. 4 is a view similar to FIGS. 2 and 3 illustrating the piston distorting in response to a pull on the tensile element.

Referring to FIGS. 2-4, the piston 14 is illustrated as generally spherical in shape to faciliate negotiating bends in the conduit 12. The piston 14 comprises a hollow member having a closed resilient peripheral wall 22 of bodily elastic material. The piston 14 is accordingly a geometric solid. As will be pointed out more fully hereinafter, the piston 14 preferably has some degree of structural integrity and is self supporting.

Means 24 are provided for connecting the tensile element 12 to the piston 14 for elongating the piston 14 and decreasing the diameter thereof when the piston 14 is stuck in the conduit 10 and the tensile element 12 is pulled. To this end, the peripheral wall 22 provides an opening 26 therein through which the lead 18 extends. An enlargement 28 is disposed inside the piston 14 and is conveniently adhesively secured to the wall 22 surrounding the opening 26. It will be apparent that the enlargement 28 closes the opening 26 and prevents the lead 18 from being pulled out of the opening 26 and thereby effectively secures the tensile element 12 and piston 14 together.

FIG. 3 represents the situation where the piston 14 has become securely lodged in the conduit 10 by an obstruction 30 and cannot be removed merely by increasing air pressure in the conduit 10. The recommended technique with this invention is to pull on the tensile element 12. Since the piston 14 is securely held at some position along the longitudinal extent thereof, a pull on the tensile element 12 tends to distort the piston 14 as suggested in FIG. 4 to elongate the piston 14 and decrease the diameter thereof. Since the piston 14 is resilient and the diameter thereof is decreasing in the region 32, a continued pull on the tensile element 12 causes the piston 14 to retreat from the conduit 10 past the obstruction 30. Since the tensile element 12 may be marked with chalk or the like when the piston 14 is securely lodged in the conduit 10, the exact location of the obstruction 30 may readily be located when the piston 14 is retrieved merely by marking an identical length along the exterior of the conduit 10.

An interesting subtlety in the piston 14 appears when one compares the force normally applied by the piston 14 to the tensile element 12 during placement and the force applied by the tensile element 12 to the piston 14 during dislodgement. Assuming for purposes of illustration that the conduit 10 is 3"I.D. and the air pressure in the inlet region 34 is 5 psi, the force developed on the wall 22 exposed to the region 34 is equal to the product of pressure and area or about 35 pounds. At this level of force application, it is desirable that the diameter of the piston 14 remain substantially the same as the internal diameter of the conduit 10 in order to prevent substantial air loss around the circumference of the piston 14. Thus the piston 14 desirably exhibits a degree of structural rigidity sufficient to avoid undue decrease in diameter during normal placement of the tensile element 12. It is thus apparent that the magnitude of the force applied to the tensile element 12 should be substantially greater than the normally developed force in order to decrease the diameter of the piston 14.

Figure 5:
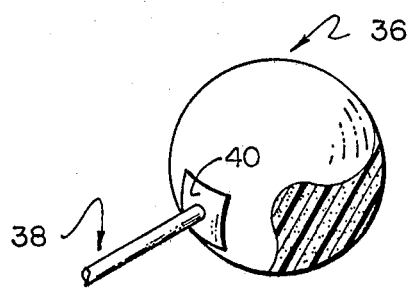
FIG. 5 is a broken isometric view of another embodiment of the invention.

Referring to FIG. 5, there is illustrated a piston 36 which is desirably spherical and which is connected to an elongate tensile element 38. The piston 36 is illustrated as made of a foamed resilient material such as rubber, organic plastic or the like. The tensile element 38 is connected to the piston 36 by a patch of material 40 adhesively secured to the periphery of the piston 36. It will be apparent that the piston 36 operates substantially the same manner as the piston 14.

I claim:

1. A method comprising
pulling a single tensile element through a conduit having therein an area where a piston can become lodged, including
attaching a tensile element to a resilient piston,
placing the piston in the conduit, and
delivering fluid under pressure into the conduit and propelling the piston therethrough;
sticking the piston in the conduit area where a piston can become lodged; and then
retrieving the piston from the conduit area where the piston has become stuck including
pulling on the single tensile element, and
elongating the resilient piston and decreasing the diameter thereof until the piston is free in the conduit.

2. In combination, a conduit and apparatus for placing a tensile element therein comprising
a resilient piston, in the conduit, having an imperforate peripheral wall of bodily elastic material;
a tensile element connected to the piston; and
means for elongating the piston and decreasing the diameter thereof when the piston is stuck in the conduit and the tensile element is pulled.

3. The apparatus of claim 2 wherein the last mentioned means comprises means connecting the tensile element to the piston.

4. The apparatus of claim 3 wherein the piston comprises a geometric solid.

5. The apparatus of claim 3 wherein the piston in an unstressed condition is generally spherical.

6. The apparatus of claim 3 wherein the connecting means comprises means attaching the tensile element to a portion of the peripheral wall.

7. The apparatus of claim 6 wherein the piston is of foamed material and the attaching means comprises means securing the tensile element to the exterior of the piston.

8. The apparatus of claim 6 wherein the piston is hollow and provides an opening thereinto and the attaching means comprises a member extending into the opening and means closing the opening and securing the member to the interior of the piston.

9. In combination, a conduit and apparatus for placing a tensile element therein comprising
a resilient piston, in the conduit, having an imperforate peripheral wall of bodily elastic material for movement through the conduit from an inlet toward an outlet; and
a tensile element connected to the peripheral wall on the inlet side of the piston;
the piston exhibiting a first shape of first diameter upon application of a first force between the piston and the tensile element and exhibiting a second diameter smaller than the first diameter upon application of a second force greater than the first force between the piston and tensile element.

10. In combination, a conduit and apparatus for placing a tensile element therein, comprising
a resilient piston, in the conduit, comprising an imperforate closed peripheral wall of bodily elastic material for movement through the conduit from an inlet toward an outlet; and
a tensile element connected to a peripheral wall on the inlet side of the piston.

11. In combination, a conduit of predetermined length and apparatus for placing a tensile element therein comprising a resilient piston, in the conduit, having an imperforate peripheral wall of bodily elastic material for movement through the conduit from an inlet to an outlet thereof;

a single tensile element of greater length than the conduit; and means connecting the piston and the tensile element together for elongating the piston and decreasing the diameter thereof when the piston is stuck in the conduit and the single tensile element is pulled.

* * * * *